United States Patent [19]

Jenson et al.

[11] Patent Number: 5,246,597

[45] Date of Patent: Sep. 21, 1993

[54] METHOD OF TREATING A SPENT CAUSTIC STREAM FROM A SOUR WATER STRIPPER TO REDUCE THE SULFIDE CONTENT THEREOF

[75] Inventors: Dale A. Jenson, Overland Park; Anne Z. Jezak, Mission, both of Kans.; Albert O. Massey, Beaumont, Tex.

[73] Assignee: Ashland Oil, Inc., Columbus, Ohio

[21] Appl. No.: 795,578

[22] Filed: Nov. 21, 1991

[51] Int. Cl.$^5$ .............................................. C02F 1/76
[52] U.S. Cl. ...................................... 210/754; 210/759
[58] Field of Search ................................ 210/754, 759

[56] References Cited

U.S. PATENT DOCUMENTS 4,473,115 9/1984 Oakes .................................. 210/754

OTHER PUBLICATIONS

"Controlling Sulfur Compounds", James P. Hawkins, Chem. Engng, 84(22), 61-65, (Oct. 11, 1977).

*Primary Examiner*—Ivars Cintins

[57] ABSTRACT

This invention relates to a method of reducing the concentration of sulfides in an aqueous system by first treating the aqueous system with hydrogen peroxide to lower the sulfide concentration to approximately 300 ppm, or less, then subsequently treating the aqueous system with chlorine dioxide to further reduce the sulfide concentration to a desirable level. The method of the invention is capable of reducing the sulfide content of the treated aqueous system to as low as tenths of a part of sulfide per million parts of sour water.

8 Claims, No Drawings

METHOD OF TREATING A SPENT CAUSTIC STREAM FROM A SOUR WATER STRIPPER TO REDUCE THE SULFIDE CONTENT THEREOF

BACKGROUND OF THE INVENTION

This invention relates to a method of treating the spent caustic stream produced by a sour water stripper wherein the caustic stream contains quantities of sulfides. The method has utility in treating the sour water produced by a stripper, such as obtained from an olefin processing plant, to reduce the concentration of sulfides to the region of tenths of parts of sulfide per million parts of sour water.

Sour water is a common byproduct of industrial processes for obtaining raw materials used in the synthesis of various polymers. In the manufacture of polyethylene, for example, a chemical feed stock is pyrolyzed under conditions suitable for obtaining ethylene gas. The ethylene gas is subsequently polymerized to polyethylene. Typically, the chemical feed stock used in the process is natural gas or naphtha which contains a quantity of $H_2S$. As $H_2S$ and other sulfides are not desired in the ethylene product and they are not destroyed in the pyrolysis process they must be stripped from the ethylene product stream. A wet air scrubber is used to remove the hydrogen sulfide by spraying an aqueous caustic solution into the ethylene product stream. The $H_2S$ is absorbed by the caustic solution and ultimately leaves the stripper as the caustic sour water stream.

The sour water obtained from such stripping operations has typically been disposed of by deep well injection, that is, by injection into geological features deep underground. As concerns mount over the dollar cost and environmental impact of this disposal method it is becoming a less acceptable way of handling sour water.

Biological treatment of sour water has emerged as a possible disposal option. In fact, biological treatment of sulfides works quite well. However, the high pH of the sour water obtained from this type of olefin sour water stripper is likely to kill the microorganisms intended to digest the sulphur compounds. Some biological treatment operations are customized to moderate the concentration of the high pH sour water by diluting the sour water with other waste water streams. However, facilities producing large volumes of sour water may not have adequate volumes of non-sour waste water streams to sufficiently dilute the caustic stream. Outright pH neutralization of the sour water by adding an acid to the sour water is not at all desirable. The pH neutralization would volatilize the sulfides in the solution and release hazardous, obnoxious smelling hydrogen sulfide gas.

Industries have attempted to reduce the concentration of sulfides present in various materials. For example, U.S. Pat. No. 4,473,115 to Oakes describes a method for reducing concentrations of hydrogen sulfide in subterranean well fluids by injecting a mixture of "stabilized" chlorine dioxide into the well. The '115 patent describes stabilized chlorine dioxide as a solution prepared by adding separately to water:

(1) a source of active oxygen, including among various materials, hydrogen peroxide;

(2) a salt, such as an alkali metal carbonate; and (3) chlorine dioxide gas which is added by bubbling it through the solution. The patent states that contacting the hydrogen sulfide in the drilling mud with the stabilized chlorine dioxide solution converts the hydrogen sulfide into insoluble colloidal sulfur.

SUMMARY OF THE INVENTION

In the present invention sulfides, such as those found in sour water from an ethylene plant, are oxidized to their sulfate state in a two step process. The residual sulfide content in the sour water after the two step treatment can be as low as tenths of parts sulfide per million parts sour water. Once the sulfide is oxidized to the sulfate state the pH of the sour water can be adjusted through addition of acids without danger of $H_2S$ being released into the atmosphere. The sulfates remain in a water soluble form after treatment and can be subject to further treatment, or can be released into the environment.

The method of the invention comprises sequentially contacting the sulfide containing sour water with two oxidizers, hydrogen peroxide and chlorine dioxide, under conditions suitable for oxidation of the sulfides to sulfates. It has been found that the sequential treatment of the invention reduces the level of sulfides in the sour water more efficiently and economically than when either oxidant is used individually. It is believed that the present invention also has applicability to all aqueous systems wherein it is desired to reduce the sulfide content thereof through oxidation of the sulfides to sulfates.

DETAILED DESCRIPTION OF THE INVENTION

More specifically, the present invention comprises the method of treating sulfides, such as those contained in alkaline pH sour water from an ethylene processing plant, by:

(1) first contacting the sulfide containing sour water with an amount of hydrogen peroxide sufficient to reduce the sulfide content of the sour water to approximately 300–10 ppm, the sulfide being oxidized to the sulfate state, and;

(2) subsequently contacting the sour water with an amount of chlorine dioxide sufficient to reduce substantially all of the residual sulfide remaining to the sulfate state, wherein the conditions under which the oxidation is carried out are suitable for oxidizing the sulfides to sulfates.

In another embodiment of the invention, hydrogen peroxide is used to reduce the sulfide concentration to approximately 100–10 ppm prior to treatment with chlorine dioxide. In a yet embodiment of the invention, hydrogen peroxide is used to reduce the sulfide concentration to approximately 50–10 ppm prior to treatment with chlorine dioxide.

The amount of chlorine dioxide used to oxidize the residual sulfides can be adjusted in order to reach a desired sulfide concentration in the sour water treated according to the invention. It will be appreciated by those skilled in the art that the desired sulfide concentration in the sour water stream may be required to meet certain acceptable levels. Such levels may be determined by environmental protection agencies or by the treatment capacity of downstream treatment systems. The method of the invention is effective in reducing the concentration of sulfides to concentrations as low as tenths of parts sulfide per million parts of sour water. Higher levels of sulfide concentration are easily obtained by the method of the invention, such as 10 ppm sulfide, 5 ppm sulfide, or 1 ppm sulfide. Those skilled in the art will appreciate that these levels are considered appropriate for many, if not most, waste stream applications.

It is believed that the present invention works as follows:

(a) When the predetermined amount of hydrogen peroxide is added to the sour water obtained from a sour water stripper it oxidizes a portion of the sulfides in the sour water according to the equation:

$$4 H_2O_2 + S^{-2} \rightarrow SO_4^{-2} + 4 H_2O$$

The quantity of hydrogen peroxide in the predetermined amount is sufficient to oxidize the sulfides so that approximately 300-10 ppm sulfides are left in the sour water; and (b) When the predetermined amount of chlorine dioxide is subsequently added to the sour water the chlorine dioxide oxidizes the residual sulfides according to the equation:

$$8 ClO_2 + 5 S^{-2} + 4 H_2O \rightarrow 5 SO_4^{-2} + 8 HCl.$$

The quantity of chlorine dioxide added to the sour water is determined by the final sulfide concentration desired in the sour water.

Because the oxidizers are believed to react in a largely stoichiometric manner with the sulfides, particularly when the sulfides are at high concentrations, the proper amount of oxidizers to be added to the sour water can be calculated from the starting concentration of the sulfides. Luckily the reaction of chlorine dioxide with the sulfides begins to become non-stoichiometric only when the sulfide concentration drops to very low levels. Typically, the reaction begins to become non-stoichiometric at less than 1 part sulfide per million parts sour water. The sequential combination of oxidizers is capable of reducing the sulfide content to as low as tenths of parts sulfide per million parts sour water. However, it is apparent that higher levels of sulfide concentration can be achieved easily with this method.

Those skilled in the art will appreciate that the sulfide ion may be present in the sour water in one or several forms, including, for example, hydrogen sulfide, sodium sulfide, and one or more organic sulfides. The term "sulfide" and the ionic formula $S^{-2}$ used herein are intended to represent all of the possible forms the sulfide ion may take in the sour water. Likewise, the term "sulfate" and the ionic formula $SO_4^{-2}$ are intended to represent the many possible forms the sulfate ion may take in the sour water, including, for example, $H_2SO_4$ (sulfuric acid), sodium sulfate, and one or more organic sulfates.

The method of the invention is typically carried out at ambient pressures. The temperature at which the method of the invention is carried out ranges from about room temperature up to about 130° F., or from about 65°-130° F. (18.3°-54.4° C.). As the sour water leaves the stripper it typically is at a temperature in the range of 100°-130° F. (37.7°-54.4° C.). Treatment of the sour water would typically begin as the water leaves the stripper, or shortly after the water leaves the stripper, so that in most circumstances the method would be carried out at approximately that 100°-130° F. (37.7°-54.4° C.) range. It will be appreciated by those skilled in the art that the reaction temperature will affect the rate at which the oxidation reactions occur. Furthermore, it will be understood that the temperature at which the method is carried out is not critical to the invention, as long as the temperature is sufficient for oxidation of the sulfides to occur.

Using both oxidants in the two-step method of the invention has a definite advantage over using either of the two oxidants alone. In a comparative test conducted on sour water containing caustic and having a sulfide concentration of approximately 500 ppm doses of hydrogen peroxide, chlorine dioxide, and sequential doses of hydrogen peroxide and chlorine dioxide were applied with the goal of reducing the sulfide concentration in the sour water to under 10 ppm. The following results were obtained from the test:

TABLE I

| TREATMENT USED | REACTION RATIO - OXIDIZER:SULFIDE REACTED | AMOUNT OF OXIDIZER USED |
|---|---|---|
| $H_2O_2$ | >15-20:1 | 20-27 lbs. |
| $ClO_2$ | 3:1 | 3 lbs. $ClO_2$ |
| $H_2O_2 + ClO_2$ | 5:1 + 3:1* | 6 lbs. $H_2O_2$ |
|  |  | 0.6 lbs. $ClO_2$ |

*3:1 is the ratio of $ClO_2$ to sulfides remaining after treatment with $H_2O_2$.

At the market prices of the oxidants at the time of filing of this application ($H_2O_2$-$.75/lb and $ClO_2$-$4.00/lb) the sour water treatment costs as tested above would be:

TABLE II

| TREATMENT USED | AMOUNT OF OXIDIZER USED | MAGNITUDE OF COST OF TREATMENT |
|---|---|---|
| $H_2O_2$ | 20-27 lbs. | $15-20 |
| $ClO_2$ | 3 lbs. | $12 |
| $H_2O_2 + ClO_2$ | 6 lbs. $H_2O_2$ | $7 |
|  | 0.6 lbs. $ClO_2$ |  |

It can be readily seen from TABLE II that treatment using the both oxidants, as in the method of the invention, is more economical than treatment with either oxidizer alone.

What is claimed is:

1. A method of reducing the concentration of sulfides in an aqueous system, the method comprising the steps of:
(a) first contacting the sulfide containing aqueous system with a predetermined amount of hydrogen peroxide under conditions for oxidizing the sulfides to sulfates, wherein said predetermined amount of said hydrogen peroxide is sufficient to reduce the sulfide concentration of the aqueous system to approximately 300-10 ppm in the aqueous system, and;
(b) subsequently contacting the aqueous system with a predetermined amount of chlorine dioxide under conditions for oxidizing the sulfides to sulfates, wherein said predetermined amount of chlorine dioxide is sufficient to oxidize the residual sulfides to a desired sulfide concentration as low as tenths of parts sulfide per million parts of said aqueous system.

2. A method as claimed in claim 1, wherein said predetermined amount of hydrogen peroxide is sufficient to reduce the concentration of sulfides to approximately 100-10 ppm in the aqueous system.

3. A method as claimed in claim 2, wherein said predetermined amount of hydrogen peroxide is sufficient to reduce the concentration of sulfides to approximately 50-10 ppm in the aqueous system.

4. A method as claimed in claim 1, wherein said conditions for oxidizing sulfides to sulfates comprises said aqueous system having an alkaline pH.

5. A method of reducing the concentration of sulfides in sour water obtained from an ethylene process sour water stripper, said method comprising the steps of:
(a) first contacting the sulfide containing sour water with a predetermined amount of hydrogen peroxide under conditions for oxidizing the sulfides to sulfates, wherein said predetermined amount of said hydrogen peroxide is sufficient to reduce the sulfide concentration of the aqueous system to approximately 300-10 ppm in the sour water, and;
(b) subsequently contacting the sour water with a predetermined amount of chlorine dioxide under conditions for oxidizing the sulfides to sulfates, wherein said predetermined amount of chlorine dioxide is sufficient to oxidize the residual sulfides to a desired sulfide concentration as low as tenths of parts sulfide per million parts of said sour water.

6. A method as claimed in claim 5, wherein said predetermined amount of hydrogen peroxide is sufficient to reduce the concentration of sulfides to approximately 100-10 ppm in the sour water.

7. A method as claimed in claim 6, wherein said predetermined amount of hydrogen peroxide is sufficient to reduce the concentration of sulfides to approximately 50-10 ppm in the sour water.

8. A method as claimed in claim 5, wherein said conditions for oxidizing sulfides to sulfates comprises said aqueous system having an alkaline pH.

* * * * *